(12) United States Patent
Hoffman

(10) Patent No.: US 7,925,401 B2
(45) Date of Patent: Apr. 12, 2011

(54) UNIVERSAL PNEUMATIC SUSPENSION CONTROL UNIT AND VEHICLE ANTI THEFT DEVICE

(76) Inventor: Lawrence Andrew Hoffman, Portland, OR (US)

(*) Notice: Subject to any disclaimer, the term of this patent is extended or adjusted under 35 U.S.C. 154(b) by 841 days.

(21) Appl. No.: 11/975,864

(22) Filed: Oct. 22, 2007

(65) Prior Publication Data
US 2009/0105905 A1    Apr. 23, 2009

(51) Int. Cl.
*B60G 17/017* (2006.01)
(52) U.S. Cl. .......................................................... 701/37
(58) Field of Classification Search ...................... 701/37
See application file for complete search history.

(56) References Cited

U.S. PATENT DOCUMENTS

| | | | | |
|---|---|---|---|---|
| 3,606,375 A | * | 9/1971 | Jackson ..................... | 280/6.159 |
| 3,838,594 A | * | 10/1974 | Kesler .......................... | 73/61.72 |
| 4,198,025 A | * | 4/1980 | Lowe et al. .................. | 248/550 |
| 4,349,077 A | * | 9/1982 | Sekiguchi et al. ............. | 180/41 |
| 4,726,604 A | * | 2/1988 | Asami et al. ............... | 280/5.514 |
| 4,852,905 A | * | 8/1989 | Tanaka et al. ................ | 280/5.51 |
| 4,911,617 A | * | 3/1990 | Buma et al. .................... | 417/439 |
| 5,176,391 A | * | 1/1993 | Schneider et al. .......... | 280/6.153 |
| 6,231,321 B1 | * | 5/2001 | Fukudome et al. ........... | 417/502 |
| 6,371,459 B1 | * | 4/2002 | Schick et al. .................. | 267/131 |
| 6,502,837 B1 | * | 1/2003 | Hamilton et al. .......... | 280/5.515 |
| 6,665,597 B1 | * | 12/2003 | Hanser et al. .................. | 701/37 |
| 6,715,778 B2 | * | 4/2004 | Gottschalk et al. .... | 280/124.157 |
| 2002/0180172 A1 | * | 12/2002 | Gottschalk et al. .... | 280/124.157 |
| 2003/0001346 A1 | * | 1/2003 | Hamilton et al. .......... | 280/5.515 |
| 2003/0038221 A1 | * | 2/2003 | Fu et al. ........................ | 248/421 |
| 2004/0256013 A1 | * | 12/2004 | Fasolino et al. .......... | 137/625.66 |
| 2005/0098401 A1 | * | 5/2005 | Hamilton et al. ............. | 188/378 |

FOREIGN PATENT DOCUMENTS

| JP | 05193325 A | * | 8/1993 |
|---|---|---|---|
| JP | 05193330 A | * | 8/1993 |

* cited by examiner

*Primary Examiner* — Thomas G Black
*Assistant Examiner* — Shelley Chen
(74) *Attorney, Agent, or Firm* — Mark S. Hubert

(57) ABSTRACT

A versatile automobile pneumatic suspension control unit and vehicle anti theft device. The microprocessor based unit allows precise calibration and operation of all manufacturer's air suspension bags and incorporates a system for deflation of all vehicle air bags so as to place the vehicle body directly onto the vehicle chassis and tires so as to disable operation of the vehicle. The unit has programmable valve timing, preset suspension configuration buttons and can be operated remotely via a key fob transmitter.

17 Claims, 2 Drawing Sheets

UNIVERSAL PNEUMATIC SUSPENSION CONTROL UNIT AND VEHICLE ANTI THEFT DEVICE

BACKGROUND OF THE INVENTION

The present invention relates to a extremely versatile automobile pneumatic suspension control unit and vehicle anti theft device. The present device allows precise calibration and operation of all vendor's air suspension bags and incorporates a system for deflation of all vehicle air bags so as to place the vehicle body directly onto the chassis or frame so as to disable operation of the vehicle. Some of the control unit features, such as the vehicle disablement mode, can be operated remotely via a key fob transmitter.

Pneumatic bag vehicle suspension systems while common on larger commercial vehicles, have recently gained popularity with the car customizers. They can be operated individually, in pairs or in unison to cause the vehicle to hop, bounce and gyrate. They also serve the more utilitarian feature of allowing the vehicle's suspension to be tuned for load adjustments, ride height, a firm ride or a sport ride.

A plethora manufactures make these air bags and a control system to operate them. Each air bag has a pressure sensor (transducer) that is matched to the programmable logic control unit (PLC). Therein lies a problem of incompatibility. Users are constrained to the operation features and modes of the PLC with that specific air bag manufacturer's system.

The present device "learns" all manufactures pressure sensors and offers numerous additional operational features. Because of its ability to match a sensor to the PLC unit, other types of sensors, such as level or motion can also be used. It can be coupled to an existing vehicle alarm system to disable the vehicle upon such a prompt and alert the owner through it's digital display. The system also incorporates programmable valve timing to allow precise inflation/deflation pressures and velocities without the "hunting" often found in electronic systems. Hunting occurs when the physical response lags the electronic response enough such that the desired variable cannot be achieved in a reasonable number of positive and negative operational cycles.

Conventional systems continually inflate or deflate the air bags until the desired pressure is reached. This can lead to "hunting" unless a proportional band and gain are incorporated into the PLC to compensate for time lag in all operational modes. The present invention utilizes a pulsed inflation and deflation wherein the timed intervals of the air admit and air exhaust valves can be set by the users for different operational modes.

Henceforth, a universal pneumatic suspension control unit and vehicle anti theft device would fulfill a long felt need in the automotive industry. This new invention utilizes and combines known and new technologies in a unique and novel configuration to overcome the aforementioned problems and accomplish this.

SUMMARY OF THE INVENTION

The general purpose of the present invention, which will be described subsequently in greater detail, is to allow the operation of a multi function universal pneumatic suspension control unit and vehicle anti theft device with any of the existing vehicle pneumatic bag suspension systems.

It has many of the advantages mentioned heretofore and many novel features that result in a new pneumatic suspension control unit which is not anticipated, rendered obvious, suggested, or even implied by any of the prior art, either alone or in any combination thereof.

In accordance with the invention, an object of the present invention is to provide an improved pneumatic control system capable of operation with most, if not all, conventional air pressure sensors as well as level sensors.

It is another object of this invention to provide an improved pneumatic control system capable of interface and operation in conjunction with conventional vehicle alarm systems.

It is a further object of this invention to provide a universal pneumatic suspension control unit and vehicle anti theft device that may be remotely operated.

It is still a further object of the present invention to provide for a universal pneumatic suspension control unit that has an interface control over individual air bags as well as grouped air bag sets.

It is still a further object of this invention to provide for a universal pneumatic suspension control unit that can precisely inflate vehicle air bags through the use of programmed valve timing wherein valve cycling can be minimized.

It is still another object of the present invention to provide for a universal pneumatic suspension control unit that can be finely tuned to the user's preferences for the rate of air bag inflation/deflation and air bag pressure tolerance regardless of the size of the other system components.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements. Other objects, features and aspects of the present invention are discussed in greater detail below.

DETAILED DESCRIPTION

Figure 1:
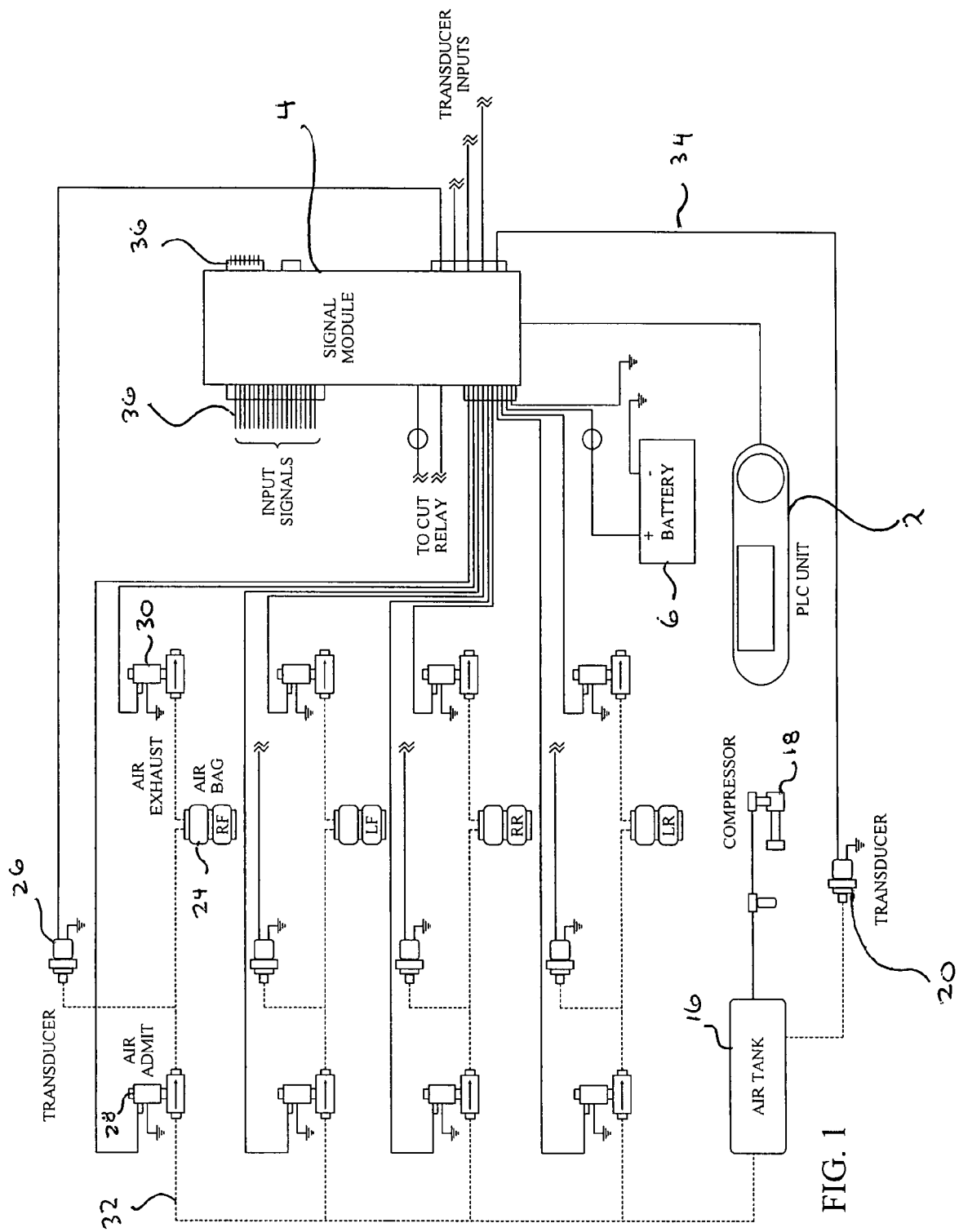
FIG. 1 is a general electrical and mechanical schematic view of the universal pneumatic suspension control unit showing the general arrangement of all components.
Figure 2:
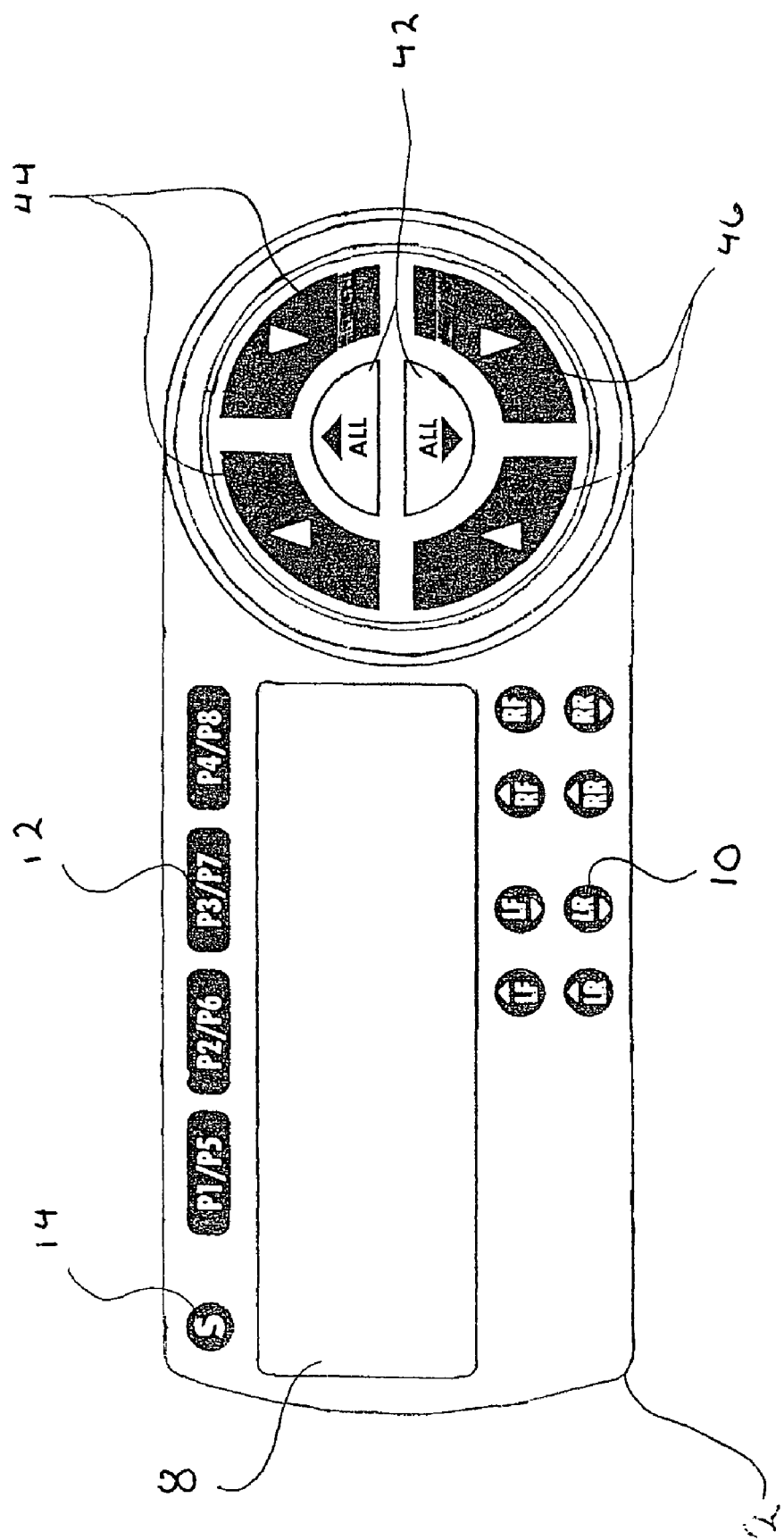
FIG. 2 is a front view of the universal pneumatic suspension control unit's interface.

The above description will enable any person skilled in the art to make and use this invention. It also sets forth the best modes for carrying out this invention. There are numerous variations and modifications thereof that will also remain readily apparent to others skilled in the art, now that the general principles of the present invention have been disclosed.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

In the following detailed description, reference is made to the accompanying drawings which form a part hereof wherein like numerals designate like parts throughout, and in which is shown by way of illustration specific embodiments in which the invention may be practiced. It is to be understood that other embodiments may be utilized and structural or logical changes may be made without departing from the scope of the present invention. Therefore, the following detailed description is not to be taken in a limiting sense, and the scope of the present invention is defined by the appended claims and their equivalents.

Air ride suspension systems for vehicles generally have the following components: a programmed logic controller/interface; a signal distribution module (wiring harness) 4; an air tank 16; an air compressor 18; an air tank pressure transducer (electronic sensor) 20; four air bags 24 located at the vehicle's right front (RF), left front (LF), right rear (RR) and left rear (LR); four air bag pressure transducers (sensor) 26; four air admit solenoid valves 28; four air exhaust solenoid valves 30 and interconnected air tubing 32 and wiring 34. Each manufacturer uses their own pressure transducers which are electronically matched for compatibility to their PLC, therein forcing purchasers to buy the manufacture's entire system.

The present invention uses numerous algorithmic programs to allow the calibration of the PLC 2 to any manufacturer's transducers, set and adjust the various parameters of the various valve operations for precision and operator preferences, operate the air bags in conjunction with the vehicle alarm system as well as enable the various system operational modes.

Referring to FIG. 1 the general mechanical and electrical layout of the present invention can be seen wherein dashed lines indicate air lines 32 and solid lines indicate electrical lines 34. The signal distribution module 4 provides the vehicle's power 6 to the system, serves as a wiring harness to route all hard wires to their associated components, has a remote signal receiver (to receive a signal from a vehicle key fob transmitter, remote vehicle alarm system transmitter or any similar vehicle auxiliary system transmitter) and has modular plug in connections 36 for the inputs of optional modules (such as a vehicle alarm system, a stereo system etc.) It is also known that the remote signal receiver may not be incorporated into the signal distribution module 4, but rather may be an accessory add on that connects through the distribution module's modular plug in connections 26.

The PLC 2 has a microprocessor (with algorithmic programmed software or firmware imbedded thereon corresponding to the various operational modes and operational instructions), memory, a backlit LCD digital display 8 and a push button interface. The PLC's push button interface has a set of individual air bag control buttons 10, a set of grouped air bag control buttons 42, 44 & 46, a set of preset air bag control buttons 12 and a shift mode button 14.

The individual air bag control buttons 10 signal the PLC 2 to adjust the current air pressure in any air bag 24 to a desired pressure. The current embodiment uses two buttons per air bag 24 to accomplish this. The grouped air bag control buttons 42, 44 & 46 signal the PLC 2 to jointly operate all the air bags 24 simultaneously, the two front air bags simultaneously or the rear two air bags simultaneously. The current embodiment again uses two buttons per grouping to accomplish this. The preset air bag control buttons 14 signal the PLC 2 to bring each of the air bags 24 to a predetermined pressure previously set by the user and stored in the PLC memory. The current embodiment allows for eight preset settings and accomplishes this with four buttons and a shift mode button 14.

The LCD 8 displays air bag pressures, optional alarm status indications, programmed valve timing parameters, learning mode pressure settings and shift operations to name a few.

The PLC 2 utilizes an operational mode, a calibration (learning) mode and a valve timing mode. The calibration mode links any air pressure transducer's signal output to the PLC 2, thereby enabling operation of the current invention with any conventional, commercially available signal transducers, whether pressure, level or otherwise. The valve timing mode allows the user to set the valve operating characteristics so as to compensate for the line diameters, size of the air bag, speed of valve opening and valve orifice size. The valve timing mode is separately enabled for the individual air bag control button sets 10 and the grouped air bag control button sets 42, 44 & 46. The operational mode simply performs the air bag inflations and deflations as given to the PLC 2 by the user through the various air bag control buttons or from an auxiliary signal input.

In the present invention's basic operation, (after the PLC 2 is calibrated for the specific pressure transducers 26, and the valve timing is programmed into the PLC 2 for the individual and grouped air bag buttons, and the PLC 2 is programmed for the air pressure deviance) the air tank's pressure transducer 20 sends a signal to the PLC 2 indicating the air tank pressure. The air compressor 18 receives a start/stop signal from the PLC 2 and operates to keep the air tank 16 pressurized within a preset range to avoid spurious operation of the compressor 18. Once the air compressor 18 has pressurized the air tank 16 to within the tolerances for the preset range the PLC 2 will shut off the compressor 18. When the user changes any air bag's pressure via the push button interface, the PLC 2 compares the new pressure to the pressure indicated by the pressure transducer 26 for that air bag 24 and generates the appropriate signal. If it is an increase in pressure, that air bag's air admit solenoid 28 is activated to admit air through an orifice to its associated air bag 24 in pulses. If the change was a decrease in pressure, that air bag's air exhaust solenoid 30 is activated to exhaust air from that air bag 24 to the atmosphere. The pulse duration and hesitation periods are set by the user. The PLC 2 activates and deactivates the solenoids 28 & 30 to get the pressure in the various air bags 24 to the desired level as manually input by the user, as an automatic response to a deviation from the current setting's pressure, as a response from a remote transmitter (key fob) or as a response to a auxiliary input such as a vehicle alarm system. In this way the ride characteristics of the vehicle's suspension system is adjusted and maintained by the PLC 2. The speed and precision at which the air bag pressure is adjusted is a function of the programmed valve timing and deviance set for that individual or grouped air bag button.

Before the operation of the present invention the following conditions must be met: the PLC 2 has to be calibrated for the specific air pressure transducers 26 used; the air tank pressure level must be programmed into the PLC 2; the valve timing's open period X and closed period Y must be programmed into the PLC 2 for the individual and preset air bag buttons 10 & 12; the valve timing's open period X and closed period Y must be programmed into the PLC 2 for the grouped air bag buttons; the air pressure tolerance must be programmed into the PLC 2 for the air tank pressure, the individual, grouped, and preset air bag pressure buttons; and the desired air bag pressure combinations must be programmed into the PLC 2 for the preset buttons 12.

The pressure setting of the air pressure tank 16 is programmed into the PLC 2 by manipulation of a series of buttons until the desired pressure is displayed on the unit's LCD 8.

The present invention "learns" the air pressure transducer output in the following manner. An air pressure gauge (preferably an analog gauge) is connected to the air tank 16. The air tank 16 is filled to any pressure via button manipulation the PLC interface unit. A series of buttons on the PLC interface are manipulated to place the PLC into the learning mode and the pressure is read on the air pressure gauge. When in the learning mode, buttons on the PLC 2 are manipulated until the value displayed on the PLC's LCD digital display 8 matches the air pressure shown on the analog gauge. Another button on the PLC 2 is pressed to end the learning cycle and to algorithmically program the PLC 2 to correspond to the current resistance of the specific transducer 20. (It is to be noted that the system requires that all air pressure transducers used are identical or have identical signal output curves.) This process must be repeated at least once at a different air pressure, but for greater accuracy can be repeated up to 15 times across a range of air pressures so as to allow the PLC 2 to recognize that transducer's signal output curve for the range of air pressures used in the system.

The pressure setting of the air pressure tank 16 is programmed into the PLC 2 by manipulation of a series of buttons until the desired pressure is displayed on the unit's LCD 8.

The precision of operation of any pneumatic control system is partially a function of the speed at which the air can move about the system in relation to how fast the sensors 26 can detect the air pressure and how fast the solenoid valves 28 and 30 can react. This is dictated primarily by the line size and the size of the orifices in the solenoid valves, which is a variable set by the manufacturer, much like the manufacture's choice in sensors. The present invention also allows for the user to set the valve timing separately for individual air bag control button sets 10 and the grouped air bag control button sets 42, 44 & 46. Properly set valve timing can maximize the system's precision and minimize it's hunting when pressurizing/deflating the air bags 24.

The solenoid valves 28 and 30 are not just opened in response to a system demanded change in air bag or air tank pressure. Rather, the valves 28 & 30 are pulsed, wherein they are sequentially opened for a period of time X and then closed for a period of time Y repeatedly, until the associated pressure transducer 26 sends a signal to the PLC 2 that the air bag's pressure lies within an allowed deviation (tolerance) from the demanded air pressure. The user sets the open pulse time X and the close pulse time Y in multiples or fractions of a second and the tolerance in plus or minus pressure units. The tolerance function can be selected on or off as it may not be necessary to minimize hunting if the open and close pulse times and the system's physical dimensions are correctly configured.

In the way of an example, smaller diameter air lines 32 in conjunction with smaller diameter valve orifices and long closed pulses are less prone to cycle above and below a desired pressure thereby allowing for pressure adjustments that fall within a narrow deviation without cycling. It is to be noted that not all users are concerned with minimizing valve cycling and have a narrow pressure tolerance. Many want the air bags 24 to inflate and deflate as quickly as possible to cause the vehicle to gyrate and hop or to respond to changing driving conditions and thus use large diameter air lines 32, large valve orifices, long open pulses and large tolerances.

The air pressure tolerance is a range of acceptable air pressures above and below all selected air pressure values that are deemed the equivalent of that selected air pressure. In this way the system only has to get close to a desired pressure to satisfy the PLC's programmed values and cease the PLC's generation of output signals to the solenoid valves 28 & 30.

The present invention's valve timing is set in the PLC by manipulating buttons on the PLC to select the individual air bag control button sets 10 or the grouped air bag control button sets 42, 44 & 46. Then by button manipulation the open pulse time X (period) and the close pulse time Y is input to display on the LCD and then programmed into memory. This effectively sets the period and frequency of the pulsed valve operation. The open pulse time and closed pulse time may be adjusted in 0.1 second increments from 0 seconds upward. Note that the individual air bag control button set 10 and the grouped air bag control button set 42, 44, 46 each has their own valve timing values. This is necessary to enable the quicker response times generally demanded from the grouped air bag control button sets 42, 44 and 46. (The valve timing for the preset buttons 12 is shared with that programmed for the individual air bag control button set 10.) Larger orifices and air lines need shorter delay intervals than do smaller orifices and air lines as more air may pass per unit time through the larger sizes. In this way, when required to send a signal to operate a solenoid valve 28 or 30 based on a sensor's input reaching a preset value in the PLC 2, the PLC 2 will delay it's output signal for that time interval to compensate for any physical system lag.

The preset air bag pressure buttons 12 are programmed in the following manner. First, each air bag 24 is selected on the PLC 2 and an air bag pressure value is input to the PCL 2 by manipulation of buttons. A preset button 12 is manipulated to correlate that pressure to that specific preset button 12 and a confirming visual signal is given on the PLC digital display 8 indicating that the values for that preset button 12 have been successfully input. Numerous preset levels are available. Now the PLC 2 will activate the air admit solenoid valve 28 and air exhaust solenoid valve 30 until the desired pressure is achieved in the air bag 24 as signaled to the PLC 2 by the sensor 26. Depending upon the system's physical limitations and the programmed valve timing, this may require numerous cycles of each of the solenoid valves 28 and 30 as the air bag pressure may over shoot and undershoot. The inflation and deflation of all air bags 24 is accomplished work in the same manner of air admit solenoid 28 and exhaust air solenoid 30 operation.

The eight individual air bag buttons 14 are labeled for the physical location of the air bag 24 and the direction of the air bag pressure change. They may be momentarily depressed to jog the air bag pressure in that direction by one pulse, or held down to enable a cycle of repeated opening periods X and close periods Y until the button 14 is released and the desired pressure is achieved.

The six grouped air bag buttons 42, 44 & 46 are positioned in a physical layout with air pressure change arrows so as to be representative of the controlled air bag locations and operation. The four buttons arranged in a segmented circle 44 & 46 simultaneously control the front two air bags 44 or rear two air bags 46. The two central buttons 42 simultaneously control all four of the vehicle's air bags. These buttons are depressed momentarily or held down to enable single or multiple pulses which are achieved within the parameters of the variable timing set for the grouped air bag buttons.

The four preset buttons 12 have dual functions wherein the second function is activated by use of a fifth shift button 14. Although described with eight programmable settings, the unit can be programmed by the manufacturer to have 2, 4, 6 or 8 presets, therein allowing various level pricing. These buttons when operated need only be depressed once to enable the PLC to take the air bags 24 controlled by that preset button 12 to their desired pressure.

The groupings of the various buttons allow the user to separate their operational functions into tuning, play, disable or favorite modes.

When utilized with auxiliary units the system can deflate and inflate the vehicle's air bags 24 according to any preset or grouped air bag function, based on an output signal from that auxiliary unit. Additionally, the system can be modified by hard wire connections to other vehicle systems such as the vehicle power door locks so as to work in conjunction with them. In such an example, when the power door locks are locked the PLC 2 would signal all air bags 24 to deflate to a level low enough to place the vehicle body onto the frame or wheels, thereby disabling the vehicle. When the door locks are opened the PLC 2 would signal all air bags 24 to return to their former pressure. The LCD 8 can be configured to display text corresponding to the feature enabled such as "alarm".

It is known that a single multi ported electric solenoid valve may be utilized in place of one air admit solenoid 28 and one air exhaust solenoid 30. In such a configuration the pneumatic suspension control unit and vehicle anti theft device wiring will be adapted so as to operated in this configuration as would be well known by one skilled in the art. As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Having thus described the invention, what is claimed as new and desired to be secured by Letters Patent is as follows:

1. A universal pneumatic suspension control unit for adjusting the air pressure in a pneumatic vehicle suspension system comprising:
 a programmable logic controller capable of internal calibration by the user for operation with various electronic signal transducers with differing signal output curves, and capable of a pulsed solenoid air valve inflation and deflation of said pneumatic suspension system, and capable of user programmable variable solenoid valve timing wherein the period and frequency of said solenoid air valve opening can be programmed into said PLC; and
 a signal distribution module connected to said programmable logic controller, system pressure transducers and system solenoid valves by wires.

2. The universal pneumatic suspension control unit of claim 1 wherein said programmable logic controller is capable of user programmable automatic air pressure regulation of a compressor that supplies air pressure to a system air tank.

3. The universal pneumatic suspension control unit of claim 2 wherein said programmable automatic air pressure regulation can be regulated within a range of pressures programmed into said programmable logic controller by said user.

4. The universal pneumatic suspension control unit of claim 1 wherein said programmable logic controller has an interface with a display and at least one series of buttons for the user adjustment of the air pressures in individual air bags of said pneumatic suspension system or for inputting programmable system operating parameters into a memory.

5. The universal pneumatic suspension control unit of claim 4 wherein there are three series of buttons, a first series of buttons for the manual inflation/deflation of said individual air bags, a second series of buttons for the manual inflation/deflation of groupings of said air bags, and a third series of buttons for the automatic inflation/deflation of groupings of said air bags based on preset air pressure values for said air bags.

6. The universal pneumatic suspension control unit of claim 2 wherein there are three series of buttons, a first series of buttons for the manual inflation/deflation of said individual air bags, a second series of buttons for the manual inflation/deflation of groupings of said air bags, and a third series of buttons for the automatic inflation/deflation of groupings of said air bags based on preset air pressure values for said air bags.

7. The universal pneumatic suspension control unit of claim 3 wherein there are three series of buttons, a first series of buttons for the manual inflation/deflation of said individual air bags, a second series of buttons for the manual inflation/deflation of groupings of said air bags, and a third series of buttons for the automatic inflation/deflation of groupings of said air bags based on preset air pressure values for said air bags.

8. The universal pneumatic suspension control unit of claim 1 wherein a period and frequency of said pulsed solenoid air valve inflation and deflation of said pneumatic suspension system is user programmable.

9. The universal pneumatic suspension control unit of claim 7 wherein a period and frequency of said pulsed solenoid air valve inflation and deflation of said pneumatic suspension system is user programmable for all inflation/deflation operations of said first series of buttons.

10. The universal pneumatic suspension control unit of claim 7 wherein a period and frequency of said pulsed solenoid air valve inflation and deflation of said pneumatic suspension system is user programmable for all inflation/deflation operations said second series of buttons.

11. The universal pneumatic suspension control unit of claim 7 wherein a period and frequency of said pulsed solenoid air valve inflation and deflation of said pneumatic suspension system is user programmable for all inflation/deflation operations said first series of buttons and said period and frequency of said pulsed solenoid air valve inflation and deflation of said pneumatic suspension system is separately user programmable for all inflation/deflation operations said second series of buttons.

12. The universal pneumatic suspension control unit of claim 1 wherein said programmable logic controller comprises a microprocessor, a memory media, and a display interface with data input buttons.

13. The universal pneumatic suspension control unit of claim 1 wherein said programmable logic controller is capable of actuating said pneumatic vehicle suspension system in response to an auxiliary input signal.

14. The universal pneumatic suspension control unit of claim 13 wherein said auxiliary input signal is generated from a vehicle alarm system.

15. The universal pneumatic suspension control unit of claim 13 wherein said auxiliary input signal is generated from a wireless remote key fob.

16. The universal pneumatic suspension control unit of claim 15 wherein said remote key fob is a wireless signal transmitter compatibly enabled to a receiver unit connected to said programmable logic controller.

17. The universal pneumatic suspension control unit of claim 1 wherein said signal distribution module has auxiliary input connections for integration of auxiliary vehicles systems.

* * * * *